Patented Dec. 10, 1935

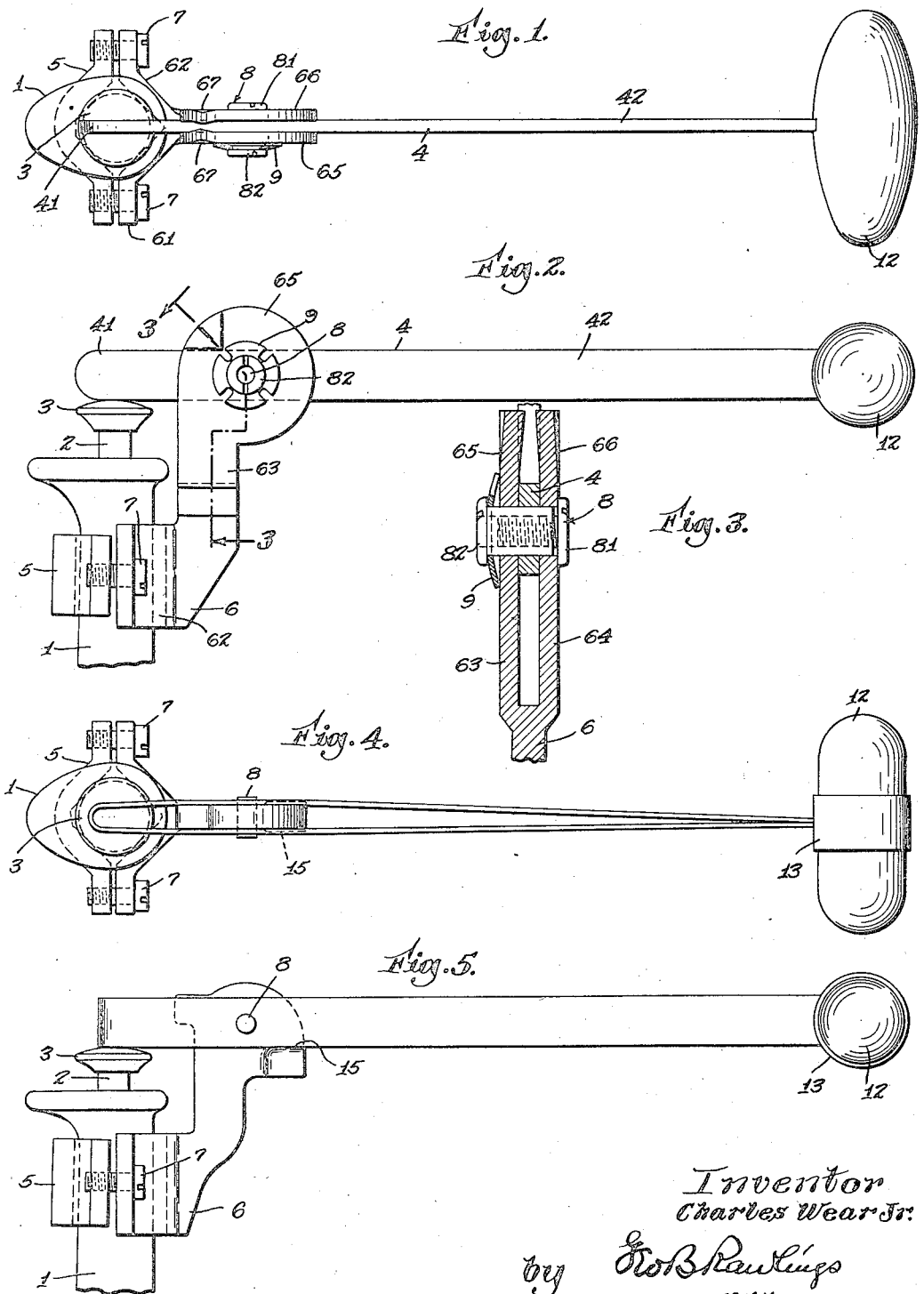

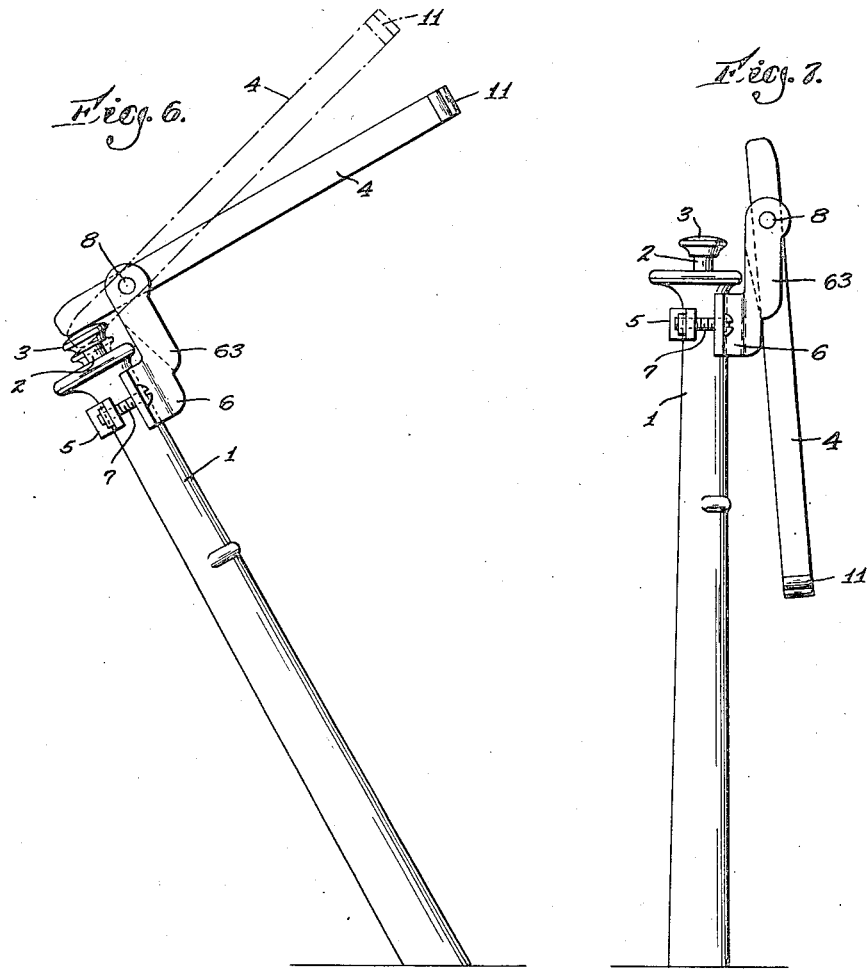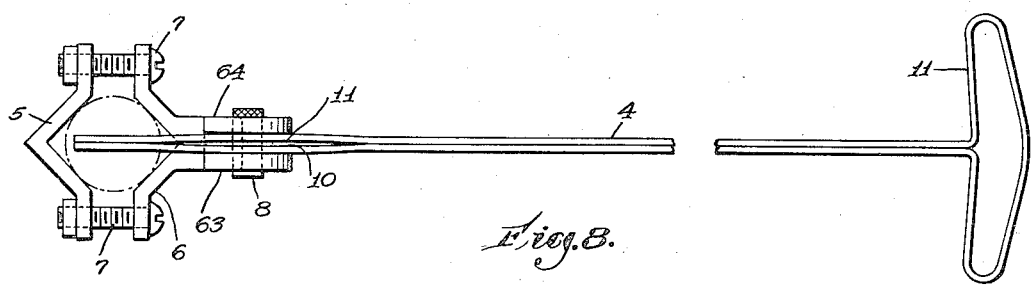

2,024,016

UNITED STATES PATENT OFFICE 2,024,016

BRAKE ASSISTING DEVICE

Charles Wear, Jr., Medford, Mass.

Application November 29, 1933, Serial No. 700,240

9 Claims. (Cl. 74—536)

This invention relates to extension handles for brake or other control levers, and is particularly intended as an attachment for the hand or emergency brake lever of an automobile. Such levers, particularly in the newer cars, are either so inaccessibly located as to be difficult of manipulation from the driver's seat to release when in set position or are of such short length as not to afford the necessary leverage to permit them to be conveniently shifted from unset to set position or from set to unset position by the driver without considerable exertion on his part.

My present invention contemplates an extension handle attachment by means of which a brake or other control lever may be readily and conveniently operated under conditions and from positions under which the lever otherwise could be manipulated only with the greatest of difficulty.

More specifically, it contemplates an extension handle attachment of universal application so as to be capable of ready mounting upon the control lever of any of the several makes of automobile which require its use, said attachment being so constructed and designed as to permit it to be folded downwardly out of the way to permit the operator to leave or enter the automobile while the brake is in set position, and to remain at any position desired with the control lever.

It further contemplates an attachment which will not rattle in any position, and which in its operation and as a part thereof will enable the operator easily to shift the brake lever from unset to set or from set to unset position.

In the accompanying drawings I have shown several embodiments of my invention which I have found highly satisfactory under actual conditions of service.

Fig. 1 is a top plan view of a conventional brake lever equipped with an extension handle attachment in accordance with one embodiment of my invention.

Fig. 2 is a side elevation thereof.

Fig. 3 is an enlarged section on the line 3—3 of Fig. 2.

Fig. 4 is a view similar to Fig. 1 but showing another embodiment of my invention.

Fig. 5 is a side elevation of Fig. 4.

Fig. 6 is a side elevation showing the conventional brake lever equipped with still another embodiment of my extension handle attachment, the lever being shown in its forward or unset position, and the dotted line position of the extension handle being the position into which the handle is adapted first to be moved, in shifting the lever from set to unset position by means of said extension handle.

Fig. 7 shows the set position of the lever and also shows the extension handle as having been folded down and towards the lever itself into an out-of-the-way position, and Fig. 8 is a plan view of the embodiment of my extension handle shown in Figs. 6 and 7.

I have indicated at 1 a control lever, which may be taken to be the usual handle or emergency brake lever of an automobile, although it is to be understood that my invention is not limited to such use alone. The lever 1 is generally of tubular form and encloses the usual latch release rod 2. The headed upper end of the release rod 2 is indicated at 3, and in accordance with usual practice projects somewhat beyond the upper end of the lever 1 for depression by the extension handle 4 preliminarily to shifting the lever, by means of such handle, forwardly from set position (see Fig. 7) to unset position (see Fig. 6).

In all of the several embodiments of my invention, my novel extension handle 4 is mounted on the lever 1 adjacent the upper end thereof by mounting means which both fix it firmly, but removably, on the lever so that the lever and handle may be shifted back and forth as a unit and at the same time permit the handle to be swung upwardly relative to the lever to depress the latch release rod 2 in shifting the lever from set to unset position, the construction being such that the handle may be folded downwardly towards the lever into the out-of-the-way position illustrated in Fig. 7 when the lever is in its set position.

Unlike those extension handle attachments of the prior art which attempt to accomplish this result by pivoting the handle on the brake lever at a point in front of the lever so as to cause the handle to bear intermediate of its ends on the latch-release rod, with consequent loss of effective leverage, my novel extension handle in each of the several embodiments thereof is so designed and mounted as to create the maximum effective leverage in any and all positions of use.

According to my invention, the mounting for the extension handle is disposed in rear of the brake lever and the handle is pivoted between its ends in said mounting. So mounted, the rear end of the handle, that is to say, the end nearest the driver, is swung up, rather than down, in order first to depress the latch rod and thereby release the brake lever. In this upward swinging movement of the handle, the handle fulcrums between its ends in the pivot mounting causing the forward end of the handle to swing downwardly against the headed upper end of the latch release rod to depress the same and release the brake lever, so that said lever may thereafter be swung forwardly to its unset position by means of said handle.

Moreover, when the brake lever shall have been drawn rearwardly to its set position, the arrangement is such in the several embodiments of my invention that the handle may be swung into an out-of-the-way position and by reason of a friction resistance incorporated in the pivot mounting, will positively remain in such position, without rattling or shifting, until again actuated.

In all of the several embodiments of my invention the handle mounting means includes a clamp member 5 and a combination clamp and pivot member, indicated generally at 6. The combination member 6 includes clamping portions 61 and 62 which are disposed opposite to the clamp 5 and define therewith a double V-type recess within which the lever 1 is received and clamped, the parts 5, 61 and 62 encircling the lever and being held in coactive clamping relation thereon by means of the screws or equivalent fastenings 7. This construction adapts the extension handle to levers of varying diameter and cross-section and hence enables the handle attachment to be used universally.

In the embodiments of my invention shown in Figs. 1, 2, 3, 6, 7 and 8, the pivot portion of the combination member 6 is bifurcated to provide a pair of upwardly disposed spaced arms 63 and 64 extending from each clamping portion 61 and 62. These are arranged in rear of the lever, that is, between the lever and the driver's seat, and extend generally parallel to the lever. They preferably terminate at or slightly above the headed upper end 3 of the rod 2 and are spaced apart a distance sufficient to receive the extension handle 4 itself, said handle being pivoted between its ends at 8 within the space separating said arms 63 and 64.

The pivot 8 of the handle 4 is thus disposed at or slightly above the upper end 3 of the rod 2 and at a point behind the same so that that portion 41 of the handle forward of said pivot may function as a rod depressing member adapted to be brought down upon the exposed upper end of the rod from above when the handle is rocked upwardly on its pivot, as shown in dotted lines in Fig. 6, the remainder of the handle 42 in rear of said pivot constituting the manipulating portion proper of the handle by means of which the handle may be first swung into said dotted line position in order to depress the latch release rod, then pushed forwardly to shift the brake lever from the set position of Fig. 7 to the unset position of Fig. 6.

In the embodiment of Figs. 4 and 5, the pivot portion of the mounting member 6 is solid rather than bifurcated, but the handle itself is bifurcated, as best shown in Fig. 4.

In all embodiments the construction is preferably such as to provide a friction or yielding resistance to the movement of the handle whereby automatically to compel it to remain in any position to which it has been swung or folded, and also to prevent rattling. This may be variously accomplished. In Figs. 1 and 2, I have shown a construction wherein the handle member is a solid bar and the pivot portion of the mounting member 6 is bifurcated. In this embodiment, the furcations 63 and 64 are extended upwardly above the plane of the handle 4 and terminate in generally circular or rounded ears 65 and 66. These are permanently crowded together in any suitable manner as by indenting them as indicated at 67, to provide a restricted space through which the handle 4 is adapted to be swung against the frictional resistance offered by said indentations to its passage.

The ears 65 and 66 are held together in the proper relation by means of the pivot pin 8, which in this instance consists of headed male and female elements 81 and 82, the male element 81 being a screw and the female element 82 being tubular and internally threaded to receive the screw, and the two being assembled through the ears and interposed lever 4 as best shown in Fig. 3.

Also as shown in said figure, I preferably interpose between the head of one of said elements 81 and 82 and one of the ears a spring lock washer 9 which is under tension when the assembly is completed and assists the action of the ears in resisting yieldingly the passage of the handle through the restricted space separating said ears, as well as tending to prevent the handle from rattling.

In Figs. 4 and 5, the handle is of spring metal and being bifurcated, has sufficient inherent resiliency so that it will tend to remain in any position to which it has been swung.

In Figs. 6, 7, and 8, both the handle and the pivot member 6 are bifurcated, the handle being constructed as a pair of abutting strips which at the region where they pass between the upright arms 63 and 64 are slightly sprung apart, as indicated at 10 in Fig. 8, to afford a yielding resistance to accidental movement of the handle. Beyond such region, the handle strips rejoin each other and continue in closely abutted relation until the handle end proper of the handle is reached, where they diverge and then return to form the handle loop 11.

With such a construction it is sometimes desirable to knurl the pivot pin 8 at one end, as shown in Fig. 8, so that when the pin is driven through the arms 63 and 64 and interposed handle 4, the knurl cuts its way into the metal of the arm and is thereby prevented from turning relative thereto.

The grasping end of the handle, instead of being a loop, as in Figs. 6, 7 and 8 may of course be a solid bar or knob, as indicated at 12 in Figs. 1 and 2 and 4 and 5, said bar or knob being permanently assembled with the handle in any suitable manner. Where the handle is a bifurcated handle as in Figs. 4 and 5, the bar or knob may be affixed thereto by means of a strap or collar 13 encircling the bar or knob and shrunk or otherwise assembled therewith.

With the construction of Figs. 4 and 5 the handle is of spring metal and in the form of a closed loop, the closed end of the loop being disposed over the upper end of the latch rod. The handle straddles the pivot member 6, which in this embodiment of my invention is solid, embracing it with a yielding spring resistance sufficient to retain the handle in any position at which it may stop. (See Fig. 4.)

In this form, also, the pivot member is provided with bosses 15 (Fig. 4) to limit the downward movement of the handle.

Where desired, any of the several embodiments may be constructed for selective change or adjustment of the pivot 8, as by forming the handle with a plurality of pivot holes within any of which the pivot pin 8 may be selectively entered and fastened.

Obviously, also, I may use other types of friction resistance and other types of clamping members for mounting my handle attachment on the control lever.

From the foregoing description, taken in connection with the accompanying drawings, it will be evident that I have provided an extension handle attachment which is mounted on the control lever in such a way that its pivot is between the lever and the driver's seat, thus utilizing that portion of the handle which is in advance of the pivot above and over the upper end of the latch release rod as a rod depressing member which when the handle is swung upwardly on its pivot presses down on the rod to release the brake lever and permit said lever to be shifted from set to unset position when the brake lever is in unset position, said handle constitutes an extension of the brake lever to enable said lever conveniently to be drawn rearwardly to its set position, and said handle finally being capable, by reason of such mounting, of being folded downwardly towards the lever into out-of-the-way position or upwardly to depress the upper end 3 of rod 2 to release the lever from set to unset position.

Various other modifications in the construction and arrangement may obviously be resorted to within the spirit and scope of my invention, as defined by the appended claims.

What I therefore claim and desire to secure by Letters Patent is:—

1. An extension handle attachment for a control lever having a latch release rod the upper end of which is exposed beyond the upper end of the lever, comprising a handle, a clamp rigidly mounting said handle on the control lever and having a pivot member disposed in rear of said lever, and a pivot disposed through said pivot member and engaging said handle between its ends, the forward portion of the handle in advance of said pivot overlying the exposed end of the latch release rod and the rearward portion of the handle in rear of said pivot constituting a manipulating portion which when grasped and swung upwardly causes the forward portion of the handle to depress the latch release rod.

2. An attachment as claimed in claim 1, wherein a friction resistance is provided between the handle and the pivot member for yieldingly retaining the handle in any position in which it is desirable that it should stop after actuation.

3. An attachment as claimed in claim 1, wherein the pivot member is bifurcated and the frictional resistance on the handle is had by forming the furcations of the pivot member with portions which decrease the effective space within which the handle may swing between its furcations.

4. An attachment as claimed in claim 1, wherein the pivot member is bifurcated and the frictional resistance on the handle is had by forming the furcations of the pivot member with portions which decrease the effective space within which the handle may swing between its furcations, and wherein the handle is pivotally connected within the furcations by means of a pivot in the form of a male and a female element penetrating respectively said furcations, the male element being threaded into the female element, and there being confined between one of said elements and an adjacent furcation a spring lock washer.

5. An attachment as claimed in claim 7, wherein the pivotal fastening is in the form of a pair of male and female elements threaded one within the other.

6. An attachment as claimed in claim 7, wherein the frictional resistance is had by constructing the handle of spring metal and bifurcating it to straddle the pivot member.

7. An extension handle attachment for a control lever having a latch release rod, the upper end of which is exposed beyond the upper end of the lever, comprising a handle, a clamp rigidly mounting the handle on the control lever and having a bifurcated pivot member disposed in rear of said lever, and a pivot disposed through said pivot member and engaging said handle between its ends, the forward portion of the handle in advance of said pivot overlying the exposed end of the latch release rod and the rearward portion of the handle in rear of said pivot constituting a manipulating portion which when grasped and swung upwardly causes the forward portion of the handle to depress the latch release rod, and said handle being of spring metal and outwardly bowed in the region wherein it is embraced by the furcations of the pivot member and there providing a yielding friction resistance.

8. An attachment as claimed in claim 7, wherein the handle is constructed as a pair of spring strips which closely abut each other except within the region wherein such strips pass between the furcations of the pivot member, said strips within such region being slightly bowed outwardly to afford a yielding friction resistance.

9. An attachment as claimed in claim 7, wherein the pivot is formed as a pin having a knurled end adapted to be passed through alining holes in the furcations of the pivot member with its knurled head driven against the outer face of one of said furcations with sufficient force to engage the knurling with said face, thereby to retain the pin against accidental withdrawal or turning.

CHARLES WEAR, Jr.